(12) United States Patent
Cao et al.

(10) Patent No.: US 11,796,013 B1
(45) Date of Patent: Oct. 24, 2023

(54) MONOSTABLE ELECTROMAGNETIC CLUTCH

(71) Applicant: Jing-Jin Electric Technologies Co., Ltd., Beijing (CN)

(72) Inventors: Yang Cao, Beijing (CN); Ping Yu, Beijing (CN); Jianwen Li, Beijing (CN); Guoshan Liu, Beijing (CN)

(73) Assignee: Jing-Jin Electric Technologies Co., Ltd., Beijing (CN)

( * ) Notice: Subject to any disclaimer, the term of this patent is extended or adjusted under 35 U.S.C. 154(b) by 0 days.

(21) Appl. No.: 18/074,150

(22) Filed: Dec. 2, 2022

(30) Foreign Application Priority Data

Apr. 2, 2022 (CN) .......................... 202210350721.X

(51) Int. Cl.
*F16D 27/09* (2006.01)
*F16D 27/14* (2006.01)

(52) U.S. Cl.
CPC ............. *F16D 27/09* (2013.01); *F16D 27/14* (2013.01)

(58) Field of Classification Search
CPC .......... F16D 27/09; F16D 27/14; F16D 27/118
See application file for complete search history.

(56) References Cited

U.S. PATENT DOCUMENTS

2021/0270322 A1* 9/2021 Stroop .................. F16D 65/186

FOREIGN PATENT DOCUMENTS

| CN | 103527687 A | 1/2014 |
| CN | 113090732 A | 7/2021 |
| CN | 215861600 A | 2/2022 |

OTHER PUBLICATIONS

European Search Report and Comm. Art. 94(3) E in EP22209920.2, dated Jul. 18, 2023, 8 pages.

* cited by examiner

*Primary Examiner* — Huan Le
(74) *Attorney, Agent, or Firm* — ArentFox Schiff LLP

(57) ABSTRACT

A monostable electromagnetic clutch is provided having a movable assembly and an electromagnetic assembly. The movable assembly is provided thereon with a return springs and can pass through the electromagnetic assembly. The electromagnetic assembly generates electromagnetic force when it is energized, and under a driving action of the electromagnetic force and an spring force of the return springs, the movable assembly can reciprocate in the electromagnetic assembly.

9 Claims, 6 Drawing Sheets

MONOSTABLE ELECTROMAGNETIC CLUTCH

CROSS-REFERENCE TO RELATED APPLICATION

This application claims priority to Chinese Patent Application No. 202210350721.X, filed on Apr. 2, 2022, the disclosure of which is hereby incorporated by reference in its entirety.

TECHNICAL FIELD

The present disclosure belongs to the technical field of clutches, and more specifically, relates to a monostable electromagnetic clutch.

BACKGROUND

There are many application scenarios requiring switching mechanism in the power system of new energy vehicles, such as gear shifting, disconnect, locking differential, parking, etc. An electromagnetic clutch is a preferred choice to realize the function of switching mechanism. With the continuous development of the new energy vehicle industry, the performance requirements of the electromagnetic clutch are becoming higher. However, conventional electromagnetic clutches have many disadvantages such as complex overall structure, incompactness, larger occupied space, fewer applicable scenarios, limited layout space and installation position, which affect the spatial configuration of various components in the power system of the new energy vehicle to a certain extent.

SUMMARY

In view of the above background, the present disclosure provides a monostable electromagnetic clutch to overcome the above problems or at least partially solve the above problems.

In order to achieve the above object, the present disclosure adopts the following technical solutions.

A monostable electromagnetic clutch, comprising a movable assembly and an electromagnetic assembly, wherein the movable assembly is provided thereon with return springs, the movable assembly can pass through the electromagnetic assembly, the electromagnetic assembly generate electromagnetic force when it is energized, and under a driving action of the electromagnetic force, the movable assembly can reciprocate in the electromagnetic assembly.

Preferably, the movable assembly comprises a movable push disc and a plurality of movable iron cores connected to the movable push disc, and the movable iron cores can pass through the electromagnetic assembly and reciprocate in the electromagnetic assembly.

Preferably, the electromagnetic assembly comprises a yoke assembly and an electromagnetic coil assembly, the electromagnetic coil assembly is disposed in the yoke assembly, and the movable iron cores pass through the yoke assembly and the electromagnetic coil assembly and are connected to the movable push disc. Under the action of electromagnetic force, the movable iron cores and the movable push disc connected thereto can reciprocate along the interior of the yoke assembly and the electromagnetic coil assembly.

The advantages and beneficial effects of the present disclosure are as follows.

The present disclosure adopts a modular design, and the movable assembly, electromagnetic assembly and return springs are integrated into an electromagnetic clutch basic unit is just consisted by two iron cores with coils on them, the movable assembly and yokes can be flexible changed based on the iron cores location. The structural design of the present disclosure is flexible and compact, and can be combined in a different way according to different applications and different structural spaces. A plurality of electromagnetic clutch basic units can be used separately, or combined freely, and after combination, they can be freely arranged in a variety of installation positions and spaces as required. Regarding the distribution space, they can be distributed evenly, symmetrically or asymmetrically according to actual needs, and the use of space can be fully optimized.

BRIEF DESCRIPTION OF DRAWINGS

By reading the detailed description of the preferred embodiments below, various other advantages and benefits will become clear to a person of ordinary skill in the art. The accompanying drawings are only used for the purpose of illustrating the preferred embodiments, and should not be considered as a limitation to the present disclosure. Moreover, throughout the drawings, the same reference numerals are used to denote the same components. In the drawings.

Figure 1:
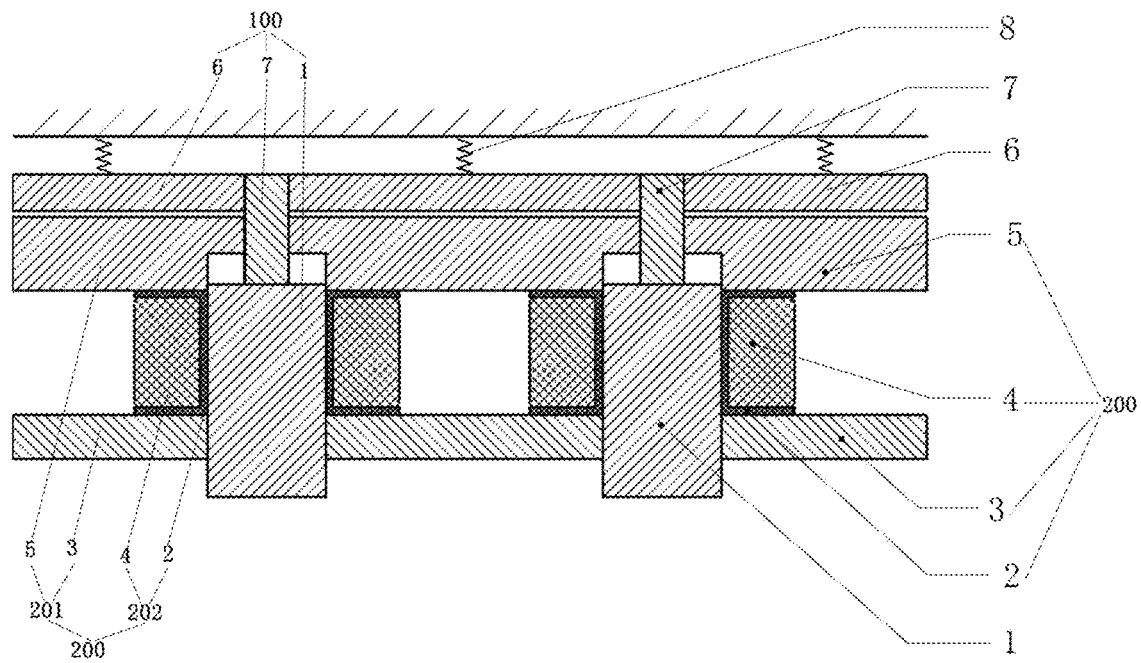
FIG. 1 and FIG. 2 are sectional views of a monostable electromagnetic clutch basic unit according to the present disclosure.

In the drawings: 100. movable assembly; 200. electromagnetic assembly; 201. yoke assembly; 202. electromagnetic coil assembly; 1. movable iron core; 2. coil bobbin; 3. second yoke; 4. electromagnetic coil; 5. first yoke; 6. movable push disc; 7. fixing pin; 8. return springs; 9. bearing; 10. L-shaped movable push disc; 11. differential case; 12. end-toothed disc; 13. planetary gear; 14. half axle gear; 15. end-toothed half axle gear; 16. locating pin; 17. position sensor.

DETAILED DESCRIPTION

In order to make the objectives, technical solutions, and advantages of the present disclosure clearer, the technical solutions of the present disclosure will be described clearly and completely in conjunction with specific embodiments of the present disclosure and corresponding drawings. Obviously, the embodiments described herein are only part of the embodiments of the present disclosure, rather than all of the embodiments. Based on these embodiments, all other embodiments obtained by a person of ordinary skill in the art without paying creative work shall fall within the protection scope of the present disclosure.

The technical solutions of embodiments of the present disclosure will be described in detail below in conjunction with the accompanying drawings. A monostable electromagnetic clutch according to the present disclosure comprises a movable assembly 100 and an electromagnetic assembly 200. The movable assembly 100 is provided thereon with a return springs 8. When it actually works, the movable assembly 100 can pass through the interior of the electromagnetic assembly 200, the electromagnetic assembly 200 can generate an electromagnetic force when it is energized, and under the action of the electromagnetic force, the movable assembly 100 can reciprocate in the electromagnetic assembly 200.

In an embodiment of the present disclosure, the movable assembly 100 further comprises a movable push disc 6 and a plurality of movable iron cores 1 connected to the movable push disc 6. The movable iron cores 1 can pass through the electromagnetic assembly 200 and reciprocate in the electromagnetic assembly 200.

Figure 2:
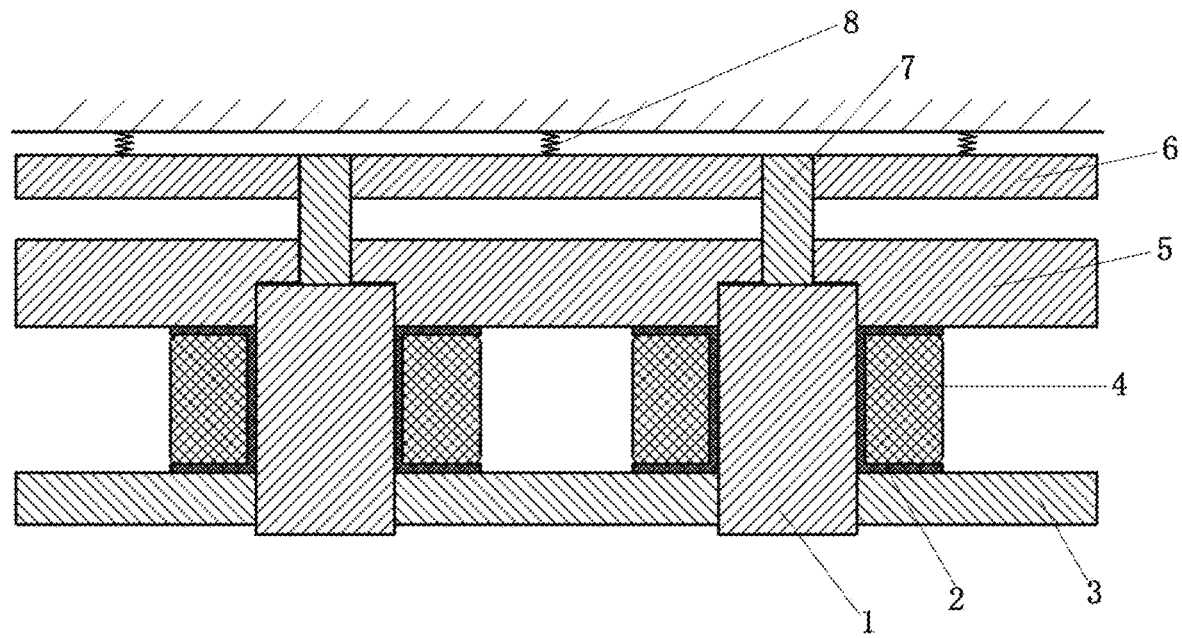

In an embodiment of the present disclosure, the electromagnetic assembly 200 further comprises a yoke assembly 201 and an electromagnetic coil assembly 202. The electromagnetic coil assembly 202 is disposed in the yoke assembly 201, and the movable iron cores 1 pass through the yoke assembly 201 and the electromagnetic coil assembly 202 at the same time and are connected to the movable push disc 6. The working flow of this embodiment is as follows. When the electromagnetic coil assembly 202 is not energized, referring to FIG. 1, the return springs 8 pushes the movable push disc 6 to a position close to the first yoke 5, and at this moment the electromagnetic clutch keeps a disengaged state. When the electromagnetic coil assembly 202 is energized, referring to FIG. 2, the movable iron core 1 and the yoke assembly 201 form a magnetic circuit. The electromagnetic force generated at this moment pushes the movable iron core 1 to a position close to the first yoke 5, and at this moment the return springs 8 is compressed. The electromagnetic force is greater than the spring force to keep the electromagnetic clutch in an engaged state. Under the action of electromagnetic force and spring force, the movable iron core 1 and the movable push disc 6 connected thereto can reciprocate along the interior of the yoke assembly 201 and the electromagnetic coil assembly 202. Preferably, in order to further improve the stability of connection, in an embodiment of the present disclosure, the movable iron core 1 is connected to the movable push disc 6 via a fixing pin 7.

In an embodiment of the present disclosure, the return springs 8 may be provided on the movable push disc 6 or provided on the movable iron core 1, as long as when the electromagnetic coil assembly 202 is not energized, the return springs 8 can push the movable push disc 6 together with the movable iron core 1 to a corresponding position to keep the electromagnetic clutch in a disengaged state.

Preferably, in an embodiment of the present disclosure, the yoke assembly 201 comprises a first yoke 5 and a second yoke 3 made of ferromagnetic material, the electromagnetic coil assembly 202 comprises an electromagnetic coil 4 and a coil bobbin 2, the coil bobbin 2 is used to fix the electromagnetic coil 4, and the electromagnetic coil 4 and the coil bobbin 2 are both provided between the first yoke 5 and the second yoke 3. In this embodiment, the first yoke 5, the second yoke 3, and the electromagnetic coil 4 cooperate with the movable iron cores 1 to generate an electromagnetic force to keep the electromagnetic clutch in an engaged state.

Preferably, in an embodiment of the present disclosure, the first yoke 5 is provided thereon with a counterbore having a shape matching the shape of the end face of the movable iron core 1. When the electromagnetic clutch is engaged, the movable iron core 1 can be embedded in the counterbore. The depth of the counterbore is also related to the travel distance of the movable push disc 6 or the movable iron core 1.

In an embodiment of the present disclosure, the return springs 8 is provided as a position-returning spring assembly, which may be a linear spring, a non-linear spring, a spring assembly composed of linear and non-linear springs, or other types of springs.

Further, a preferred solution of the present disclosure is that a monostable electromagnetic clutch basic unit comprises two electromagnetic coil assemblies 202, two movable iron cores 1, two fixing pins 7, one movable push disc 6, one first yoke 5, one second yoke 3 and a plurality of return springs 8. In this embodiment, the electromagnetic clutch basic unit has fewer parts, is simple in structure and does not occupy much space. The electromagnetic clutch basic units can be applied separately, or a plurality of electromagnetic clutch basic units can be combined freely. Their application scenarios include but are not limited to the following scenarios.

Example 1

Figure 3:
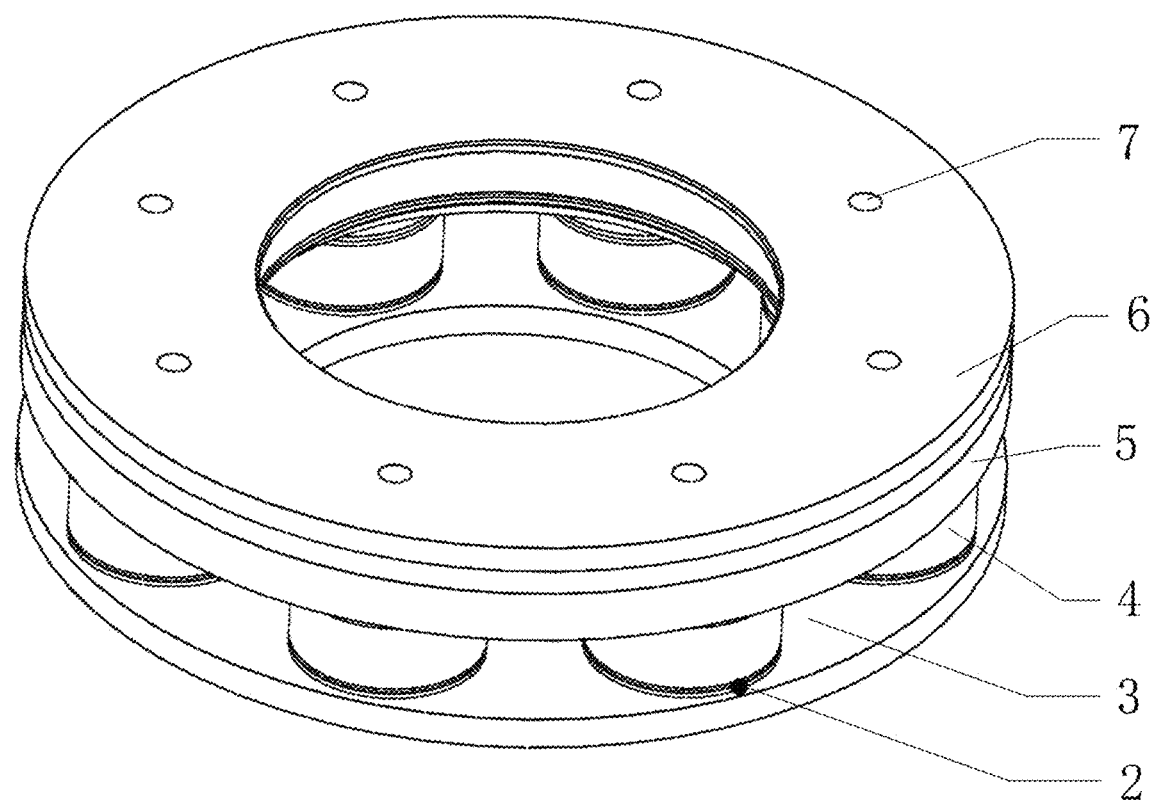
FIG. 3 is a combined application of a monostable electromagnetic clutch according to example 1 of the present disclosure.

Referring to FIG. 3, in this embodiment, a plurality of electromagnetic clutch basic units is uniformly arranged circumferentially to form an annular electromagnetic clutch structure. In this example, four electromagnetic clutch basic units are uniformly distributed along the circumferential direction. The first yoke 5, the second yoke 3 and the movable push disc 6 are all integrated into a whole disc.

This example can be applied to the situation where the circumferential space is larger and the axial space is smaller.

Example 2

Figure 4:
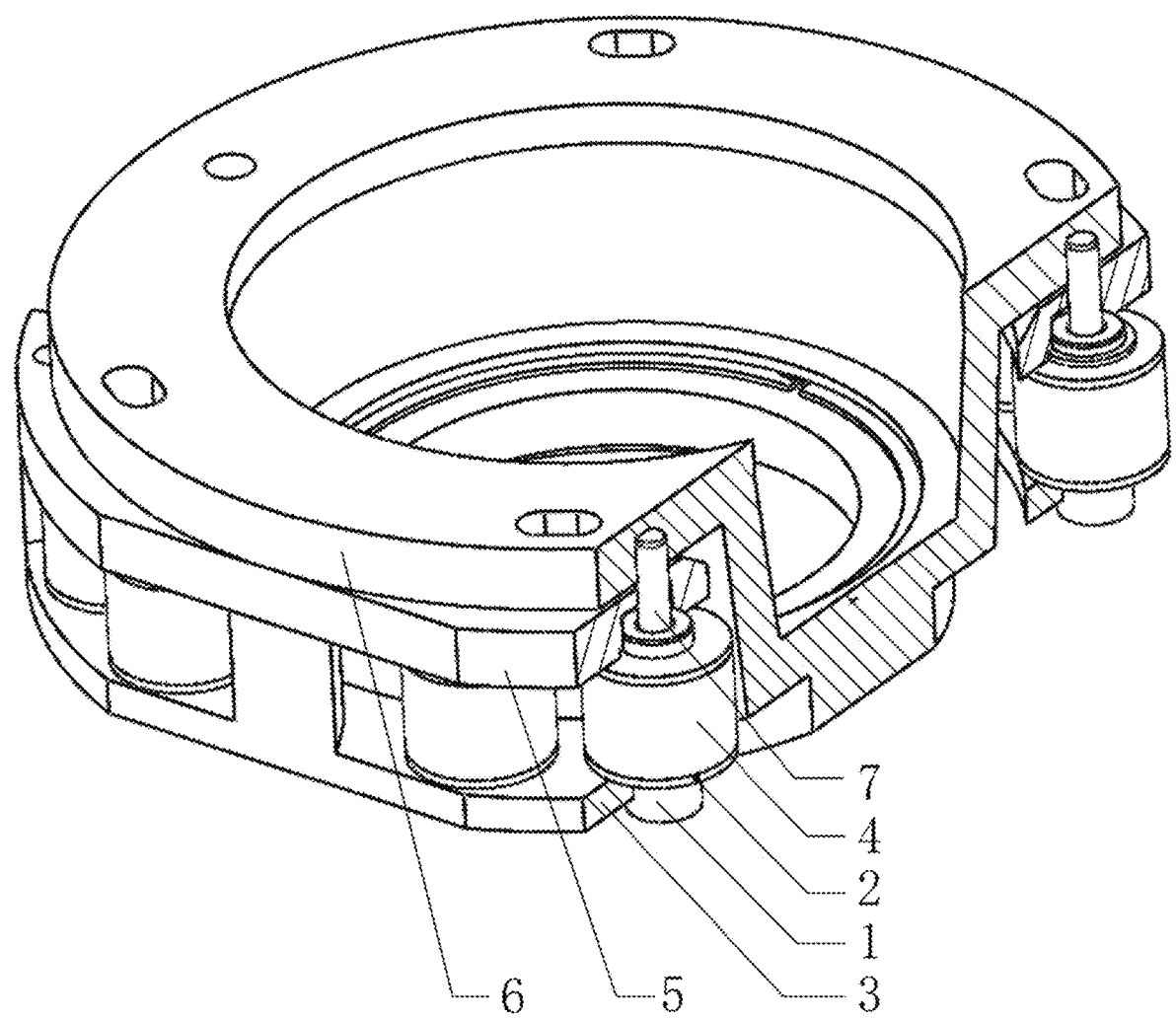
FIG. 4 and FIG. 5 are a combined application of a monostable electromagnetic clutch according to example 2 of the present disclosure.
Figure 5:
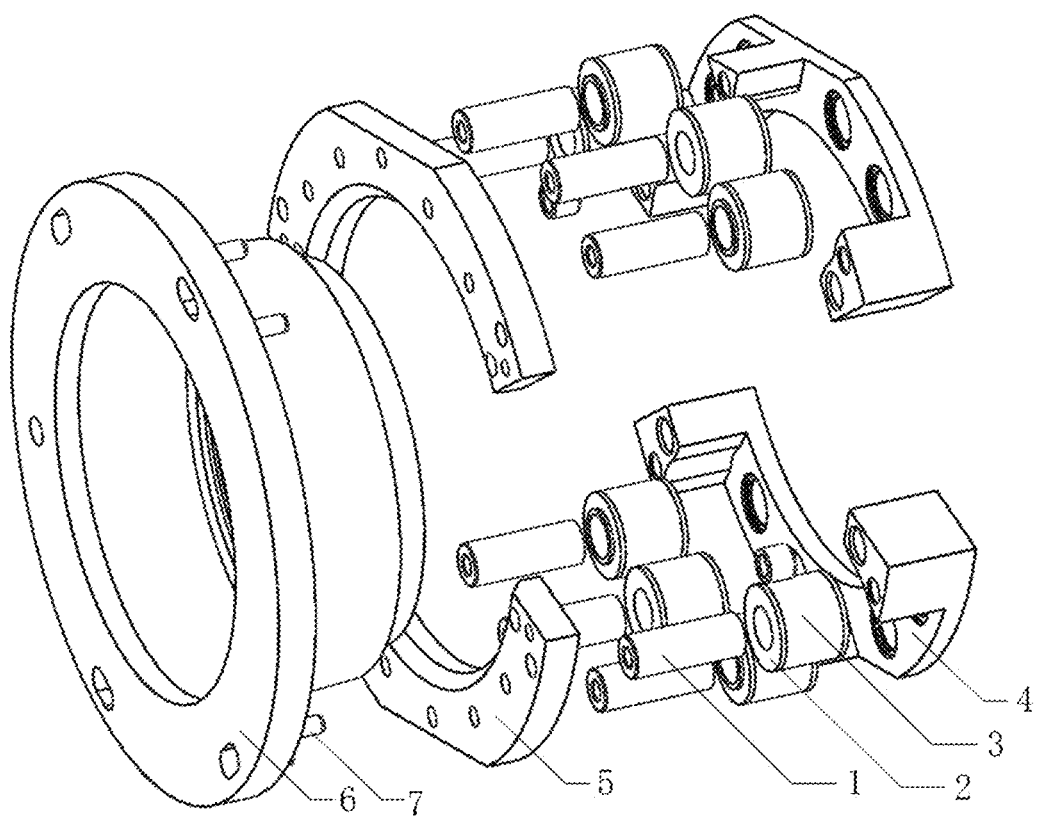

Referring to FIG. 4 and FIG. 5, in this embodiment, two electromagnetic clutch basic units are combined to form an arc-shaped subassembly, and then the two arc-shaped subassemblies are symmetrically distributed. The first yoke 5 and the second yoke 3 are integrated into two arc-shaped discs. The movable push disc is integrated into an L-shaped disc.

This example can be applied to the situation where the space in the circumferential direction is limited.

Example 3

Figure 6:
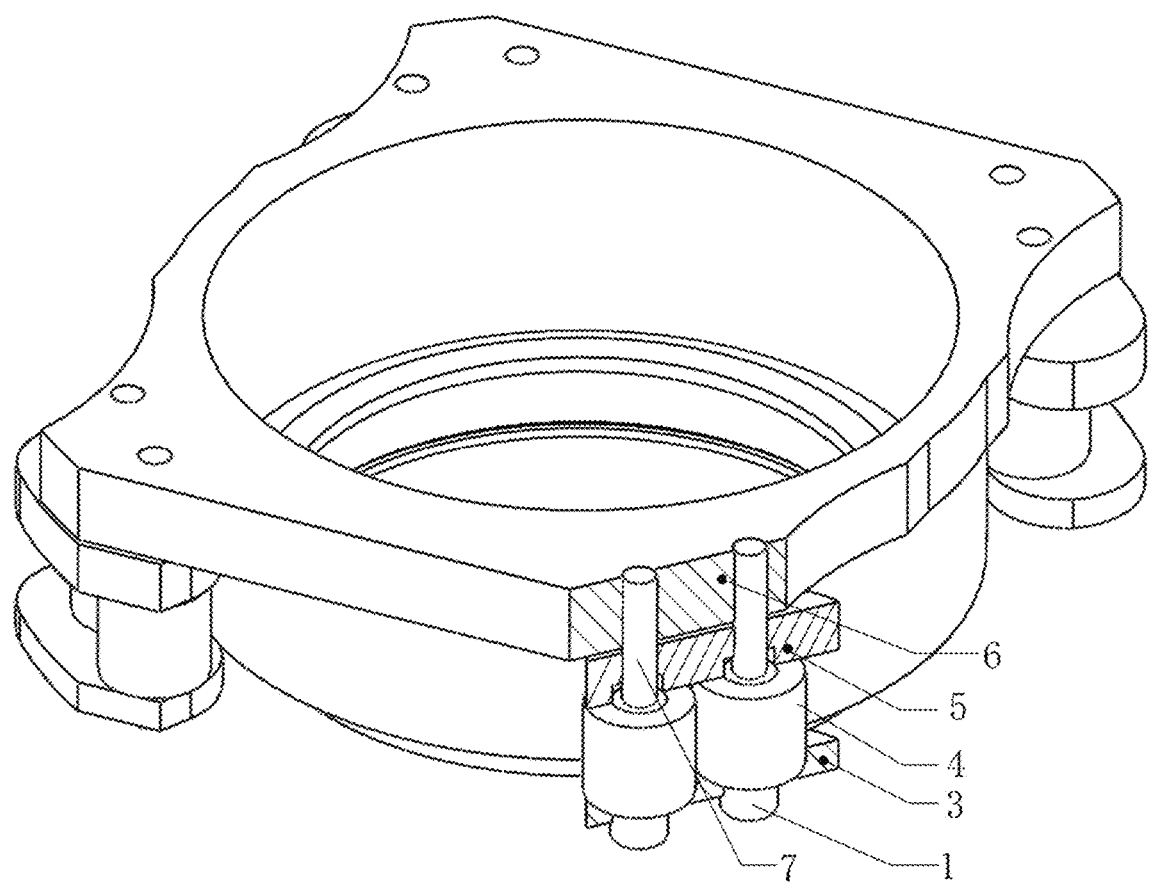
FIG. 6 is a combined application of a monostable electromagnetic clutch according to example 3 of the present disclosure.

Referring to FIG. 6, in this embodiment, the electromagnetic clutch basic units are independently distributed in four corners. The first yoke 5 and the second yoke 3 are designed according to the space and the magnetic circuit, and give way to other parts or assemblies as far as possible without affecting the magnetic circuit so as to fully optimize the use of space, and the movable push disc is integrated into a whole round L-shaped disc.

Example 4

Figure 7:
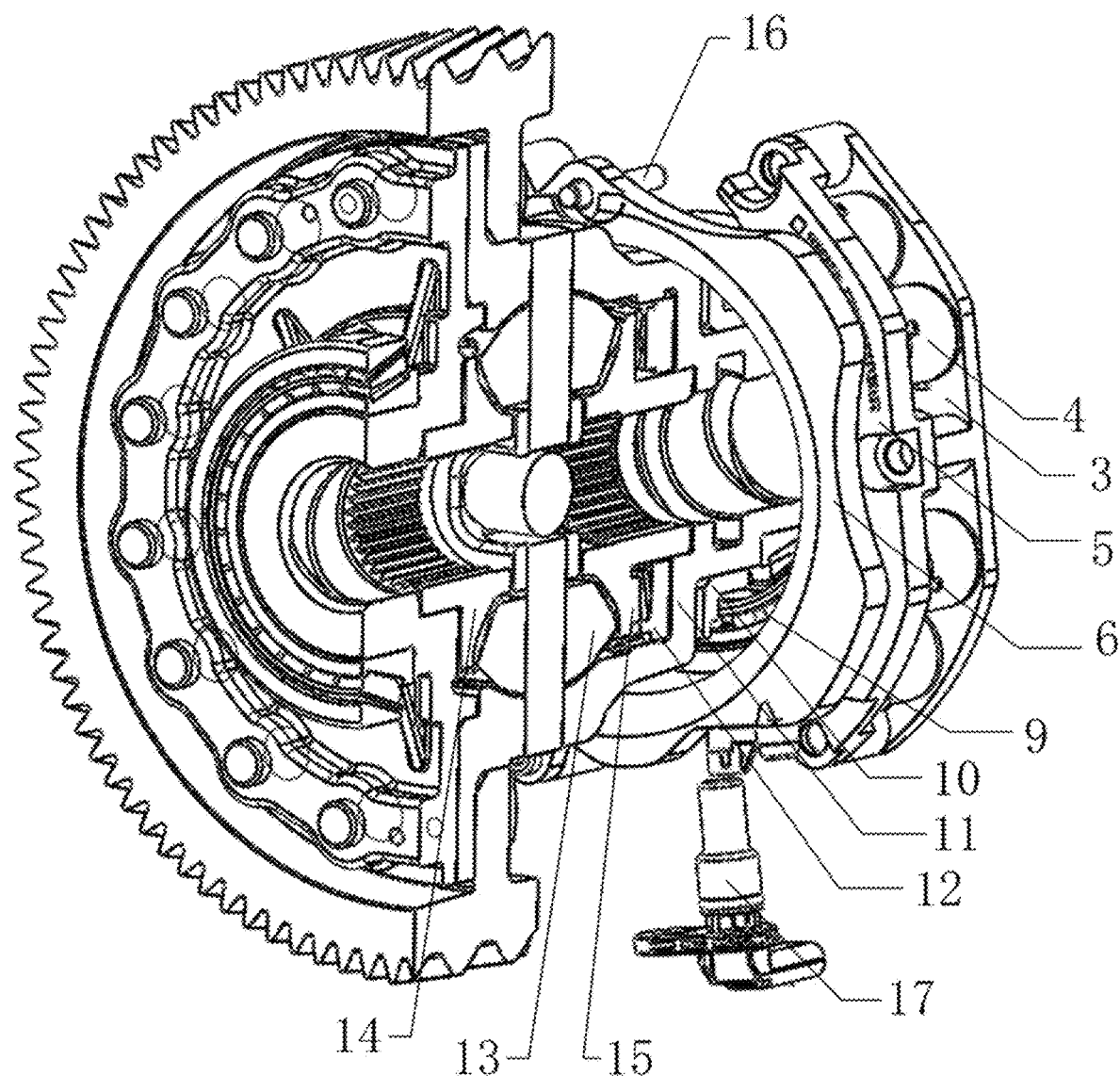
FIG. 7 is an application of the example 2 to realize differential lock function.

Referring to FIG. 7, in this embodiment, the example 2 is specifically applied to the differential lock function. In this embodiment, the electromagnetic clutch in example 2 is sleeved at a side of a differential. The movable push disc 6 is connected to the L-shaped movable push disc 10 via a bearing 9, so that the movable assembly of the electromagnetic clutch body can only move linearly in the axial direction. At the same time, in order to limit the rotation and movement in other degrees of freedom of the movable assembly of the electromagnetic clutch body, in this embodiment, the movable push disc 6 is also provided thereon with a locating pin 16, which is fixed and restricts the movable assembly to move only axially. The L-shaped movable push disc 10 and an end-toothed disc 12 are connected by bolts, pins or protrusions on the L-shaped movable push disc 10/the end-toothed disc 12. The connecting part passes through the differential case 11. The outer edge of the end-toothed disc is provided with a key, the differential case is correspondingly provided with a key slot, and during the rotation of the differential, the end face teeth are driven by the key connection to transmit rotation speed and torque.

As shown in FIG. 7, an end-toothed half axle gear 15 is provided with end face teeth which can mesh with end face teeth on the end-toothed disc 12. A spring assembly is provided between the differential case 11 and the L-shaped movable push disc 10. When the electromagnetic clutch is in a disengaged state, the spring assembly between the differential case 11 and the L-shaped movable push disc 10 keeps the end face teeth on the end-toothed disc 12 and the end face teeth on the end-toothed half axle gear 15 in a disengaged state. At this moment, the differential can operate in a different-speeds mode and in a normal mode. When an excitation current is supplied to the electromagnetic coil 4, the electromagnetic clutch engages, and the movable iron core 1 moves toward the first yoke 5. At the same time, the fixing pin 7 is driven to move in the same direction, and the fixing pin 7 drives the movable push disc 6 to move in the same direction. The movable push disc 6 pushes the L-shaped movable push disc 10 via a bearing 9. The L-shaped movable push disc 10 pushes the end-toothed disc 12 to move toward the end-toothed half axle gear 15 via the connecting part until the end-toothed disc 12 is engaged with the end face teeth of the end-toothed half axle gear. The movable assembly stops upon moving to a position-limiting device on the differential case 11 and the L-shaped movable push disc 10. The differential lock is now in an engaged/locked state. There is no relative movement between the end-toothed half axle gear 15 and the differential case 11 after the differential is locked. At this moment, the end-toothed half axle gear 15 in the differential transmits the rotation speed and torque to another half axle gear 14 via a planetary gear 13. At this moment, the torques at two sides of the differential are completely the same, and the differential lock function is realized.

The above only describes the specific embodiments of the present disclosure. Under the above teaching of the present disclosure, a person skilled in the art can make other improvements or modifications on the basis of the above embodiments. A person skilled in the art should understand that the above specific description is only for better explaining the purpose of the present disclosure, and the protection scope of the present disclosure should be subject to the protection scope of the claims.

What is claimed:

1. A monostable electromagnetic clutch comprising:
   an electromagnetic assembly; and
   a movable assembly provided on the electromagnetic assembly with return springs,
   wherein the movable assembly is configured to pass through the electromagnetic assembly,
   wherein under a driving action of an electromagnetic force of the electromagnetic assembly and a spring force of the return springs, the movable assembly is configured to reciprocate in the electromagnetic assembly, and
   wherein the movable assembly comprises a movable push disc and a plurality of movable iron cores connected to the movable push disc, and the movable iron cores are configured to pass through the electromagnetic assembly.

2. The monostable electromagnetic clutch according to claim 1, wherein the electromagnetic assembly comprises a yoke assembly and an electromagnetic coil assembly, the electromagnetic coil assembly is disposed in the yoke assembly, and the movable iron cores are configured to pass through the yoke assembly and the electromagnetic coil assembly and are connected to the movable push disc.

3. The monostable electromagnetic clutch according to claim 2, wherein the movable iron core is connected to the movable push disc via a fixing pin.

4. The monostable electromagnetic clutch according to claim 2, wherein the return springs are provided on the movable push disc.

5. The monostable electromagnetic clutch according to claim 2, wherein the yoke assembly comprises a first yoke and a second yoke, the electromagnetic coil assembly comprises an electromagnetic coil and a coil bobbin, the coil bobbin is configured to fix the electromagnetic coil, and the electromagnetic coil and the coil bobbin are provided between the first yoke and the second yoke.

6. The monostable electromagnetic clutch according to claim 5, wherein the first yoke is provided thereon with counterbores that have a shape matching with a shape of an end face of the movable iron cores.

7. The monostable electromagnetic clutch according to claim 5, wherein the return springs are a position-returning spring assembly, and the position-returning spring assembly is at least one of a linear spring, a nonlinear spring, and a spring assembly composed of linear and nonlinear springs.

8. The monostable electromagnetic clutch according to claim 5, wherein the first yoke and the second yoke comprise a ferromagnetic material.

9. The monostable electromagnetic clutch according to claim 5, further comprising two electromagnetic coil assemblies, two movable iron cores, two fixing pins, one movable push disc, one first yoke, one second yoke and a plurality of return springs.

* * * * *